Aug. 25, 1953 — R. K. ILER ET AL — 2,650,200
PROCESS OF MAKING A CONCENTRATED SILICA SOL
Filed Dec. 14, 1951
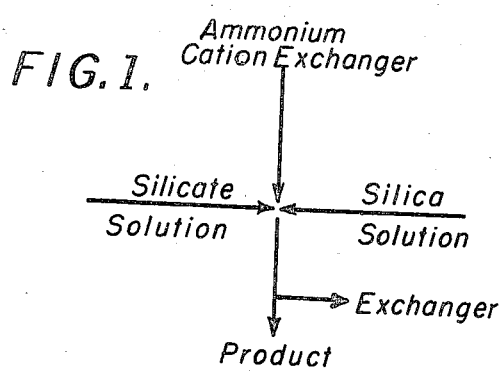
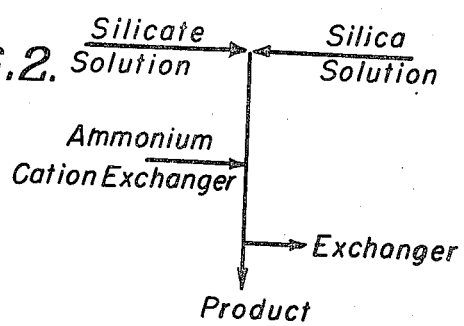
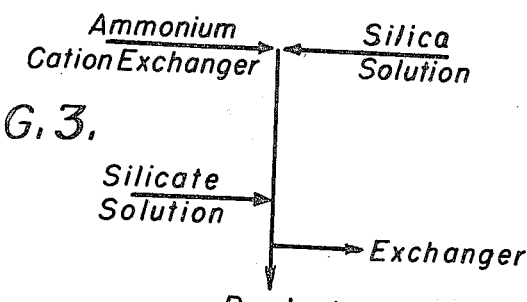
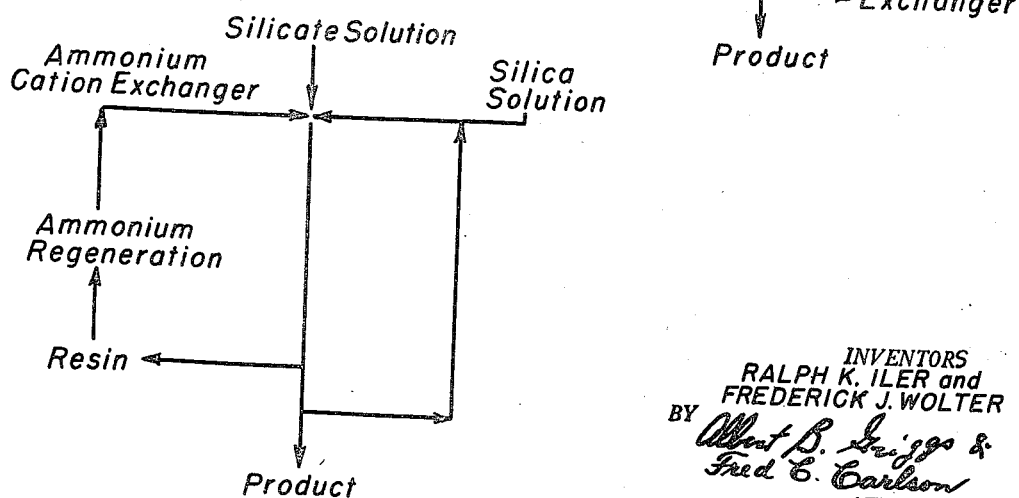
INVENTORS
RALPH K. ILER and
FREDERICK J. WOLTER
BY
Albert B. Griggs &
Fred E. Carlson
ATTORNEYS Patented Aug. 25, 1953

2,650,200

UNITED STATES PATENT OFFICE 2,650,200

PROCESS OF MAKING A CONCENTRATED SILICA SOL

Ralph K. Iler and Frederick J. Wolter, Wilmington, Del., assignors to E. I. du Pont de Nemours & Company, Wilmington, Del., a corporation of Delaware Application December 14, 1951, Serial No. 261,836

3 Claims. (Cl. 252—313)

This invention relates to the preparation of concentrated silica sols by processes wherein a more dilute silica sol is mixed with an alkali metal silicate and the resulting mixture is contacted with the ammonium form of a cation-exchanger. The silica sol used may be prepared by cation-exchange and preferably by cation-exchange with the ammonium form of a cation-exchanger. The invention is still further directed to processes in which the sols being treated are heated during a recycling operation through the ammonium form of a cation-exchanger to obtain sols of high concentration and great stability.

In the drawings,

Figure 1 illustrates an embodiment of the invention, and

Figure 2 is a similar diagrammatic illustration of a modified process of the invention, and Figure 3 is a still further modification, and Figure 4 is a still further modification similar to that of Figure 1, but illustrating a cyclic process of the invention.

If a silica sol effluent is prepared by a process such as that shown in the Bird Patent 2,244,325 the concentration which may be obtained directly is quite limited. If the sodium silicate solution has a high $SiO_2$ content, silica will gel on the cation-exchanger.

It has been proposed to prepare sols of somewhat higher concentration by contacting a sodium silicate solution with the hydrogen form of a cation-exchanger to produce an acid sol which is thereafter stabilized by the addition of alkali and then heated to convert the ionic silica to an inactivated form. This process, however, is subject to the disadvantage that lowering the pH of the silica sol on each exchange through the cation-exchanger causes instability in the sol and causes partial or total gelling. Moreover, a considerable number of passes must be made through the resin with the alternate acidification, alkalization, and heating, before a sol of a desirably great concentration is obtained.

According to processes of the present invention, a sodium silicate solution is added to silica sol to adjust the pH to above about 8, but so that there is less than about 0.7 normal of sodium ion, and the mixture is contacted with the ammonium form of a cation-exchanger. The process may be repeated a number of times in cyclic fashion to increase the concentration of the sol. If desired, the system may be maintained at an elevated temperature to promote build-up of the silica particles and to provide sols of increased stability and concentration.

The preferred sols produced are composed of dense particles of silica and the particles are quite uniform in size and are substantially without aggregation.

Silica sols which may be used as starting materials include any products which are comparatively dilute and which are of such a character that they can be concentrated without gelling. There may be used, for example, sols prepared by redispersing gels in the presence of alkali at high temperature. Such sols are not preferred, however, because the particles are aggregated and are not uniform in size and shape.

Any of the silica sols shown in the Bechtold and Snyder U. S. Patent 2,574,902, dated November 13, 1951, may be used. Preferred sols are those which are obtained by ion-exchange as shown, for example, in the Bird patent, U. S. 2,244,325, and which have been heated in the presence of at least a trace of alkali. Such sols are described in the Bechtold and Snyder patent as suitable nuclei for the preparation of sols of larger particle size. It will also be understood that sols prepared as in Bechtold and Snyder can be treated according to the present invention, but there is comparatively little advantage in treating sols of large particle size.

The preferred practices of the invention employ sols prepared, as for example, in the Voorhees patent, U. S. 2,457,971, and which have been heated in the presence of at least a trace of alkali. It will be seen hereafter that an ammonium form of a cation-exchanger is used in processes of the invention, and the preferred starting sols are those which have been prepared by the treatment of a soluble silicate with the ammonium form of an exchanger, and which have thereafter been heated to effect at least some stabilization. It is to be noted that the use of ammonium cation-exchangers under certain conditions is covered in a U. S. application of Frederick J. Wolter, Serial Number 265,195, filed January 5, 1952.

While there has been considerable discussion above of the starting sol, it will be understood that this term can be applied to the silica sol to which sodium silicate is added according to the invention, during any of a number of cyclic passes through processes of the invention. This aspect of the invention will be more clearly understood in connection with the specific description of processes of the invention hereinafter.

It will be noted of the starting sols that they may be comparatively dilute, say 2 or 3% $SiO_2$ in water, and may range upwardly in concentration to near the upper limit of stability for the particular particle size and character of sol. Ordinarily, there would be no great advantage in using a sol of higher concentration than, say, 20%, or so $SiO_2$.

Any alkali metal silicate may be used. Sodium silicate will usually be described throughout the specification, since this is the cheapest of the silicates, but it will be understood that potassium silicate is equivalent. The silicate used may have any mole ratio of $SiO_2:Na_2O$ from 1:1, that is metasilicate, up to 4:1, or say more practically, 3.9:1.

The strength of the sodium silicate solution to be added to a silica sol according to the invention can, of course, be widely varied. The strength would preferably be such that there is a higher concentration of $SiO_2$ in the silicate solution than in the sol to which it is added. If this is not the case, then there will, of course, be no concentration of the final aqueous sol with respect to silica. One could, of course, use more dilute sodium silicate solutions, and the resulting sols could then be concentrated as desired. Such processes would not ordinarily be used throughout the process, but might be used at certain parts of the cycle where it might show advantage.

In general, it will be preferable to use sodium silicate solutions containing near the upper limit of solubility of the silicate in water, or the upper limit of the concentration at which the silicate solution is stable and fluid. Commercial sodium silicate solutions commonly known as waterglass contain about 20 to 30% $SiO_2$, and these are useable in these commercial concentrations. In some products the viscosity will be so high that it may be desired to dilute somewhat, so that they will be more easily mixed with the silica sols.

The amount of sodium silicate solution added to a silca sol according to the invention may be widely varied. The amount added initially should be at least great enough so that the pH of the resulting mixture will be above 8. The amount required will, of course, depend upon the alkalinity of the silicate used. The upper limit on the amount of sodium silicate added is fixed by the sodium ion concentration of the resulting mixture. It should not be so high as to exceed about 0.7 normal for the sodium ion concentration before the mixture is brought into contact with the cation-exchanger. In many processes of the invention, the figure will be much lower because the sodium ion will be withdrawn almost simultaneously with its addition to the sol. In such cases, it will be preferred to operate with the sodium ion concentration of the mixture below about 0.35 normal.

The mixture of sodium silicate and silica sol is passed through the ammonium form of a cation-exchanger according to the invention to produce a silica sol. Instead of passing the mixture through the exchanger, the cation-exchanger can be slurried with the mixture. Such manipulative processes will be described hereinafter in more detail.

Any insoluble cation-exchanger in the ammonium form may be used in processes of the invention and there may be used, for instance, sulfonated carbonaceous exchangers, sulfonated or sulfited insoluble phenol-formaldehyde resins or acid-treated humic material, or other similar exchangers. Sulfonated coal, lignin, peat, or other insoluble sulfonated humic organic material may be used.

Even more preferable are the insoluble resins made from phenols, such as those made from phenol itself, diphenylol sulfone, catechol, or naturally occurring phenols, as found, for example, in quebracho, and an aldehyde, particularly formaldehyde, which are modified by the introduction of sulfonic groups either in the ring or on methylene groups.

Cation-exchangers which are stable in their ammonium forms are available commercially under such trade names as "Amberlite," "Ionex," "Zeokarb," "Nalcite," and "Ionac."

It is, of course, preferred that the resins selected be comparatively stable at the temperature and alkalinity of the processes of the invention. While the unstable cation-exchangers may be used a few times, they cannot under practical conditions of operation be re-used continuously.

One of the suitable cation-exchange resins for use according to the present invention is an aromatic hydrocarbon polymer containing nuclear sulfonic acid groups which is designated "Dowex-50" and of the general type described in D'Alelio U. S. Patent 2,366,007 and which is fully described as to its characteristics, properties, and general mode of use in the Journal of the American Chemical Society, for November 1947, volume 69, No. 11, beginning at page 2830.

The synthesis and structure of ion-exchange resins is reviewed in "Annual Review of Physical Chemistry," volume 2, 1951, published by Annual Reviews, Inc., Stanford, California, and reference should be had particularly to the section by G. E. Boyd. A suitable class of cation-exchangers are the carboxylic type such as, for example, a cross-linked copolymer of styrene and maleic anhydride, and a crosslinked polymethacrylic acid or polyacrylic acid, the crosslinking being conducted, for instance, with divinylbenzene. In the publication cited, on page 316 there is decribed a carboxylic type cation-exchanger prepared by polymerizing mathacrylic acid with about ten per cent of its weight of divinylbenzene using a peroxide catalyst. This general type of product is commercially available as "Amberlite IRC-50"

It will be understood that after cation-exchangers have been used in accordance with processes of the invention they may be regenerated in accordance with customary methods as by treatment with acid, followed by treatment with suitable ammonium compounds or ammonia. They may be treated alternatively with an ammonium salt solution containing an excess of ammonia.

While it is preferred to use the cation-exchangers in the ammonium form, they may be used in the form of other nitrogen bases. They may, for instance, be used in the methylamine or ethylamine form. These free amines are volatile and can readily be removed from the resulting sols. Mixtures of amines or mixtures of amines with ammonia may also be used.

It will be understood that the mixtures treated with cation-exchangers according to the invention contain silica in two forms. Part of the silica is present as silica particles of colloidal size. These, for example, will range in size from about, say, 4 to 130 millimicrons. There is also present silica in the form of sodium silicate which is unpolymerized and which is in the "ionic" state. It will also be understood that there may be silica in intermediate stages of polymerization between the "ionic" and the colloidal range. These, according to processes of the invention, will rapidly be converted to larger particle sizes in the colloidal range.

The present invention permits the direct production of sols like those described by Bechtold and Snyder, by the treatment of such a mixture of colloidal silica and a sodium silicate with a cation exchanger in the ammonium form, providing the mixture is held at some point at a temperature above about 60° C., and at a pH above about 8.

Such sols are preferred. They are composed of particles which are quite dense, and may have a particle size from about 5 to 150 millimicrons. These sols can be concentrated to a greater or lesser extent depending upon the particle size, the sols of larger particles being more stable and susceptible to higher concentration in aqueous systems.

In preferred processes of the invention the mixture of silica sol and sodium silicate, either during the cation-exchange or thereafter, is preferably heated. The temperature of heating depends upon the rate at which the process is conducted. Generally, temperatures below about 60° C. require excessively long times, and it will be preferred to use a temperature of at least 60° C. Especially where large particles are desired in the finished sol, much higher temperatures will be used up to the boiling point or even somewhat above. Considerations as to temperatures and times are very much as set out in the Bechtold and Snyder patent above mentioned.

It will further be understood that as in the Bechtold and Snyder process the pH during the heating step should be maintained above about 8. This can be done either by retaining ammonia in the system or by adding suitable quantities of an alkali such as sodium silicate.

Considering the various specific processes illustrated in the drawing, it will first be seen that in Figure 1, a sodium silicate solution is illustrated as being added, for example, to a reaction vessel simultaneously with a silica sol and the ammonium form of a cation-exchanger. It will be seen in Figure 1 that the silica sol is referred to as a "silica solution," by which, of course, is meant a colloidal aqueous silica solution or, more simply, a silica sol.

In bringing the three components together as illustrated in Figure 1, the rate of addition of each should be such that the sodium ion concentration is at all times below about 0.7 normal, and of course the pH should be above 8. It is well to keep an excess of a silica sol in the reaction zone, because if there is any excess of sodium silicate the control of the sodium ion normality may become somewhat difficult.

While the overall sodium ion normality of the system should not exceed 0.7 normal prior to the contact with the ammonium form of the cation-exchanger, it is even better to have the normality below 0.35.

Referring to Figure 1, it will be understood that the three components may be brought together at various rates subject to the general conditions above outlined in a large reaction vessel in which the quantity of silica sol is present, the reaction vessel should be provided with means for vigorous agitation. Alternatively, the three components may be brought together at a point and passed through a pipe in turbulent flow or through a pipe or other reaction vessel provided with suitable baffles for effecting agitation.

After most of the sodium ion has been abstracted from the system by the cation-exchanger or even after all of the sodium ion has been abstracted, the exchanger is separated from the solution. This may be effected by filtration or decantation.

According to preferred processes of the invention the silica sol will be heated as above described at a pH as indicated. It is preferred in following a process like that shown in Figure 1 that the mixture be heated during the ion-exchange, but heating could be effected after the exchanger has been separated.

Referring immediately to Figure 4, there will be seen a process like that of Figure 1, in which the cation-exchange resin is regenerated as by the use of a solution of an ammonium salt, and this is then returned, after washing and draining, to the process. A portion of the product after heating is run back as feed solution. A portion of the product is, of course, continuously withdrawn. In beginning the operation, the process may be started with a silicate solution and the ammonium form of a cation-exchanger on the first pass. The silica sol produced, after it has been suitably heated, can then be returned and mixed with a further quantity of sodium silicate and the ammonium cation-exchanger. This cycle may be repeated until a suitable character of product is obtained before any of the product is withdrawn. The product may thereafter be withdrawn either continuously or from time to time as desired.

In Figure 2 there is illustrated a modification in which the silica solution and silicate solution are first brought together and an ammonium cation-exchanger is thereafter added to the mixture. The exchanger is withdrawn as in Figure 1. The heating step can again occur during the ion-exchange step, or the entire process may be conducted at the temperature levels which are preferred, as in Figure 1. Thus, the silica sol may be hot, the sodium silicate solution may be hot, or the mixture may be heated before, during, or after the ion-exchange.

In connection with Figure 2, it will again be understood that the exchanger can be regenerated and returned, and a portion of the product can be returned as the silica solution for starting the process. Here again, as in Figure 1, the high temperature level of the silica solution will be maintained throughout without any appreciable temperature drop. As a practical matter, the silicate solution will ordinarily not be heated, but the mixture or the incoming silica solution will be heated appropriately as desired.

The processes of Figure 2 again can be carried out by bringing the silica sol and silicate solution together in a reaction vessel as in Figure 1 after adding the ammonium ion-exchanger. Alternatively, the two solutions may be introduced into a pipe or other continuous type of reactor and the ammonium cation-exchanger added after mixing has been accomplished.

In Figure 3 there is illustrated a further modification in which the ammonium form of the cation-exchanger and the silica solution are first brought together, and the silicate solution is thereafter added. Heating, pH control, sodium ion normality control, and the recycling of exchanger and product can be effected as in the previously illustrated modifications. The equipment used may either be a single reactor or series of reactors, or may be a pipe-line or other continuous type of reactor of the character previously described.

In all of the processes described it is important that the silicate solution can be mixed with the silica solution in such a manner as to avoid local high concentrations of sodium ion. In other words, even if the average sodium ion normality is below 0.7, it is not satisfactory to have local concentrations at which the sodium ion normality is notably higher. It is, of course, impossible to avoid completely a zone where the sodium silicate solution first comes into contact with the silica sol, where there is not an instantaneous sodium ion concentration greater than 0.7. This, however, must not be allowed to exist for more than an instant. Such concentrations can be avoided, as has previously been suggested, by maintaining extreme turbulence or high agitation at the point of mixing.

While the cation-exchanger may be added to a stream or to a reaction vessel containing the silica solution and the silicate solution, it may instead be used as a column through which the mixture of solutions can be passed.

In order that the invention may be better understood, reference should be had to the following illustrative example:

Example

A starting sol was first made as follows: A solution of sodium silicate having an $SiO_2:Na_2O$ weight ratio of 3.25 and an $SiO_2$ content of 4 per cent by weight was placed in a reaction vessel provided with means for agitation and heating. The solution was heated to 95° C. and "Dowex 50–G," described above, was added in an acid form, having been regenerated with sulfuric acid, and being in a washed, wet, drained condition. The exchanger was slowly added to the solution of silicate over a period of two hours. The total amount of resin added was sufficient to lower the pH of the solution finally to about 9.5. During the period of addition and heating there was agitation of the system.

The result was a silica sol which was separated by decantation from the resin. The silica sol had an $SiO_2$ content slightly lower than the original silicate because of the water introduced on the resin. This sol was then used as the starting sol for a process of the invention.

This silica sol, containing about 4% of $SiO_2$ was placed in a vessel and the temperature was maintained at about 95° C. The ammonium form of "Dowex 50–G" was added in sufficient quantity to maintain the sodium ion normality below 0.35 during the subsequent addition of the sodium silicate solution. A sodium silicate solution such as that used in making the starting sol, except that it contained 12% $SiO_2$ by weight, was slowly added to the mixture. The pH was maintained in the neighborhood of 9 to 10. The solution was, of course, agitated at all times and the rate of addition of the sodium silicate solution was such that one part by weight of silica in the incoming solution was added for one part of the original silica in the starting solution per hour. This was continued for a period of six hours so that 6 parts of silica in the form of sodium silicate solution was added for each part of silica present in the original sol.

During the heating and agitation ammonia was swept from the system using steam, which supplied a considerable portion of the heat needed for maintaining the temperature of the solution. During the run the solution increased in concentration and in turbidity and the particle size of the fine particles in the sol was increased. The final sol had an $SiO_2$ content by weight of about 11%. The final pH of the sol as measured at 30° C. on a cool portion, in the absence of resin, was 8.5, this value being obtained by minor adjustments of resin and sodium silicate solution at the end.

The sol was separated from resin, heated for a period of half an hour at 95° C., and then concentrated by direct evaporation to a concentration of 30 per cent $SiO_2$.

This application is a continuation-in-part of our U. S. application, Serial No. 128,243, filed November 18, 1949, now abandoned.

We claim:

1. In a process for making a concentrated silica sol the steps comprising adding an alkali metal silicate to a silica sol, the alkali metal ion concentration of the mixture being less than 0.7 normal and the pH being above 8, and contacting the mixture with the ammonium form of a cation-exchanger.

2. In a cyclic process for making a concentrated silica sol, the steps comprising adding sodium silicate to a silica sol, the sodium ion concentration of the mixture being less than 0.7 normal and the pH being above 8, and contacting the mixture with the ammonium form of a cation-exchanger, adding sodium silicate to the sol thus produced, and again effecting contact of the mixture with a cation-exchanger under the conditions just described.

3. In a cyclic process for making a concentrated silica sol, the steps comprising adding sodium silicate to a silica sol, the sodium ion concentration of the mixture being less than 0.7 normal and the pH being above 8, and contacting the mixture with the ammonium form of a cation-exchanger, adding sodium silicate to the sol thus produced, and again effecting contact of the mixture with a cation-exchanger under the conditions just described, the liquid phase throughout the process being held at a temperature above about 60° C.

RALPH K. ILER.
FREDERICK J. WOLTER.

References Cited in the file of this patent
UNITED STATES PATENTS

| Number | Name | Date |
|---|---|---|
| 2,244,325 | Bird | June 3, 1941 |
| 2,457,971 | Voorhees | Jan. 4, 1949 |